US008027676B2

(12) United States Patent
Moon et al.

(10) Patent No.: US 8,027,676 B2
(45) Date of Patent: Sep. 27, 2011

(54) RADIO NETWORK CONTROLLER AND RADIO COMMUNICATIONS METHOD

(75) Inventors: Sung Uk Moon, Yokosuka (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 748 days.

(21) Appl. No.: 11/847,727

(22) Filed: Aug. 30, 2007

(65) Prior Publication Data

US 2007/0298796 A1 Dec. 27, 2007

Related U.S. Application Data

(63) Continuation of application No. 10/901,236, filed on Jul. 29, 2004, now Pat. No. 7,266,372.

(30) Foreign Application Priority Data

Jul. 29, 2003 (JP) .................................. 2003-203153

(51) Int. Cl.
*H04W 4/00* (2009.01)
(52) U.S. Cl. ................ 455/435.1; 455/3.01; 455/456.1; 370/328; 370/342
(58) Field of Classification Search ............... 455/456.1, 455/3.01, 435.1; 370/328, 342
See application file for complete search history.

(56) References Cited

U.S. PATENT DOCUMENTS

| | | | |
|---|---|---|---|
| 6,122,483 A * | 9/2000 | Lo et al. ........................ | 455/12.1 |
| 6,697,631 B1 * | 2/2004 | Okamoto ..................... | 455/457 |
| 6,822,948 B2 | 11/2004 | Bergström et al. | |
| 6,917,807 B1 | 7/2005 | Vialen et al. | |
| 6,961,588 B2 | 11/2005 | Watanabe | |
| 7,372,842 B2 * | 5/2008 | Kim et al. ..................... | 370/345 |
| 2002/0168984 A1 * | 11/2002 | Wallentin ...................... | 455/452 |
| 2003/0043786 A1 * | 3/2003 | Kall et al. ..................... | 370/352 |
| 2003/0207688 A1 | 11/2003 | Nikkelen | |
| 2003/0231612 A1 | 12/2003 | Kim et al. | |

(Continued)

FOREIGN PATENT DOCUMENTS

JP 2003-179683 6/2003

(Continued)

OTHER PUBLICATIONS

"3$^{rd}$ Generation Partnership Project; Technical Specification Group Radio Access Network; Introduction of the Multimedia Broadcast Multicast Service (MBMS) in the Radio Access Network (Stage-2); (Release 6)", 3GPP TS 25.346 V2.0.0 (Jun. 2003), Technical Report, Global System for Mobile Communications, XP-002467543, Jun. 2, 2003, pp. 1-22.

(Continued)

*Primary Examiner* — Jinsong Hu
*Assistant Examiner* — Qun Shen
(74) *Attorney, Agent, or Firm* — Oblon, Spivak, McClelland, Maier & Neustadt, L.L.P.

(57) ABSTRACT

A radio network controller can set up a connection with a mobile station located in a specific cell under control of the radio network controller. The radio network controller includes a connection setup request transmitter configured to transmit a connection setup request for request to set up the connection to the mobile station located in the specific cell; and a judger configured to judge whether or not to need to acquire information of the mobile station located in the specific cell. The connection setup request transmitter is configured to transmit the connection setup request to the mobile station located in the specific cell, when the judger judges to need to acquire the information of the mobile station.

3 Claims, 6 Drawing Sheets

U.S. PATENT DOCUMENTS

| | | | |
|---|---|---|---|
| 2004/0106430 A1 | 6/2004 | Schwarz et al. | |
| 2004/0127243 A1 | 7/2004 | Sarkkinen | |
| 2004/0259547 A1 | 12/2004 | Lau et al. | |
| 2005/0015583 A1* | 1/2005 | Sarkkinen et al. | 713/150 |
| 2006/0166653 A1* | 7/2006 | Xu et al. | 455/412.2 |
| 2006/0176872 A1 | 8/2006 | Serna et al. | |

FOREIGN PATENT DOCUMENTS

| | | |
|---|---|---|
| JP | 2003-189356 | 7/2003 |
| WO | WO 03/019828 A2 | 3/2003 |
| WO | WO 03/058866 A2 | 7/2003 |

OTHER PUBLICATIONS

"3$^{rd}$ Generation Partnership Project; Technical Specification Group GSM/EDGE Radio Access Network; Multimedia Broadcast Multicast Service (MBMS) in the GERAN; Stage 2 (Release 6)", 3GPP TS 43.246 V0.6.0 (Jul. 2003), Technical Specification, Global System for Mobile Communications, XP-002467544, Jul. 21, 2003, pp. 1-14.

3$^{rd}$ Generation Partnership Project Technical Specification Group Radio Access Network, 25.331 v5.4.0 Radio Resource Control (RCC) protocol specification (Release 5), 2003.

* cited by examiner

RADIO NETWORK CONTROLLER AND RADIO COMMUNICATIONS METHOD

CROSS REFERENCE TO RELATED APPLICATIONS

This application is a Continuation of U.S. patent application Ser. No. 10/901,236, filed Jul. 29, 2004, and is based upon and claims the benefit of priority from the prior Japanese Patent Application No. P2003-203153, filed on Jul. 29, 2003. The entire contents of these applications are incorporated herein by reference.

BACKGROUND OF THE INVENTION

1. Field of the Invention

The present invention relates to a radio communications method for set up a connection between a radio network controller and a mobile station located in a specific cell under control of the radio network controller, and a radio network controller used in the radio communications method.

2. Description of the Related Art

Conventionally, a radio communications system using a W-CDMA (Wideband-Code Division Multiple Access) scheme, that is to say, a radio communications system for set up a connection between a radio network controller and a mobile station located in a specific cell under control of the radio network controller is known.

As shown in FIG. 1, the radio communications system using the W-CDMA scheme is configured with a core network CN, a radio network controller RNC, node-Bs, and mobile stations UEs (User Equipments).

In fact, there are a plurality of radio network controllers RNCs, a plurality of node-Bs, and a plurality of mobile stations UEs. However, in order to simplify an explanation, FIG. 1 shows one radio network controller RNC, two node-Bs #1 and #2, and two mobile stations UE#1 and UE#2.

In the radio communications system using the W-CDMA scheme, a radio access network RAN (UTRAN) is configured with the radio network controller RNC and the node-Bs.

The radio network controller RNC is connected to the core network CN via an Iu interface. The radio network controller RNC is configured to perform management of radio resources, control of node-Bs and the like. For example, the radio network controller RNC performs control of a handover process.

The node-B is connected to the radio network controller RNC via a Iub interface. To be more specific, the node-B is configured with a base station which controls one or more cell(s).

When the node-B divides the cells into a plurality of sectors by using a plurality of directional antennas, so as to control the sectors, each sector is called a "cell" in the embodiment.

In FIG. 1, the node-B #1 controls a cell #1, and the node-B #2 controls a cell #2.

The mobile station US is configured to be connected to the node-B and the radio network controller RNC via a radio interface.

A protocol architecture of the radio interface in the radio communications system using the W-CDMA scheme consists of a protocol layer including a physical layer (a layer 1), a data link layer (a layer 2), and a network layer (a layer 3).

The layer 2 is divided into a MAC (Media Access Control) sub-layer and a RLC (Radio Link Control) sub-layer.

An RRC (Radio Resource Control) which belongs among the layer 3 has a function of providing various services with an upper layer. The various services include a notification of broadcast information to all mobile stations UEs located in cells which the radio network controller RNC controls, a call of a specific mobile station by the radio network controller RNC (transmission of paging), and setup/change/release of an RRC connection between the radio network controller RNC and the mobile station UE.

As shown in FIG. 2, a state of the mobile station UE changes from an Idle mode to a Connected mode (an RRC connected state), when a connection is established between the mobile station UE and the radio network controller RNC.

On the other hand, the state of the mobile station UE changes from the Connected mode to the Idle mode, when the connection is released between the mobile station UE and the radio network controller RNC.

FIG. 3 shows a sequence of when the state of the mobile station UE changes from an Idle mode to a Connected mode in the conventional radio communications system for providing an MBMS (Multimedia Broadcast Multicast Service).

As shown in FIG. 3, in step 101, the mobile station UE #1 is working in the Idle mode. That is, the mobile station UE #1 is working in the state where an RRC connection is not set up between the mobile station UE #1 and the radio network controller RNC.

In step 102, the core network CN transmits a paging for calling the mobile station UE #1 to the radio network controller RNC.

In step 103, the radio network controller RNC transfers the received paging to the mobile station UE #1 via the node-B #1.

In step 104, the mobile station UE #1 performs an RRC connection setup procedure for setting up an RRC connection between the mobile station UE #1 and the radio network controller RNC by transmitting an RRC connection request to the radio network controller RNC, when the paging received by the mobile station UE #1 is directed to the mobile station UE #1.

In step 105, the state of the mobile station UE #1 changes for the Idle mode to the Connected mode.

However, in the conventional radio communications system using the W-CDMA scheme, the radio network controller RNC is configured to manage information (the number, the reception capability and the like) of mobile stations UEs of Connected mode located in specific cells which the radio network controller RNC, the core network CN is configured to manage the information of mobile stations UEs of Idle mode located in the specific cells.

Therefore, there is a problem in that the radio network controller RNC can not grasp movement of the mobile stations UEs of the Idle mode in cells under control of the radio network controller RNC, so as not to accurately manage the information of the mobile stations UEs located in the cells.

BRIEF SUMMARY OF THE INVENTION

In viewing of the foregoing, it is an object of the present invention to provide a radio communications method in which the radio network controller can accurately manage the information of the mobile stations located in cells under control of the radio network controller, and a radio network controller used in the radio communications method.

A first aspect of the present invention is summarized as a radio network controller which can set up a connection with a mobile station located in a specific cell under control of the radio network controller. The radio network controller includes a connection setup request transmitter configured to transmit a connection setup request for request to set up the connection to the mobile station located in the specific cell; and a judger configured to judge whether or not to need to acquire information of the mobile station located in the specific cell. The connection setup request transmitter is configured to transmit the connection setup request to the mobile station located in the specific cell, when the judger judges to need to acquire the information of the mobile station.

In the first aspect, the connection setup request transmitter can be configured to transmit the connection setup request to a mobile station located in a specific area which is formed by at least one cell under control of the radio network controller.

A second aspect of the present invention is summarized as a radio communications method for set up a connection between a radio network controller and a mobile station located in a specific cell under control of the radio network controller. The method includes transmitting, at the radio network controller, a connection setup request for request to set up the connection to the mobile station located in the specific cell; and setting up, at the mobile station, the connection with the radio network controller in accordance with a received connection setup request.

DETAILED DESCRIPTION OF THE INVENTION

A Configuration of a Radio Communications System According to a First Embodiment of the Present Invention Referring to figures, the configuration of a radio communications system according to a first embodiment of the present invention will be described.

The entire configuration of the radio communications system according to the first embodiment is same as the entire configuration of the conventional radio communications system using the W-CDMA scheme.

The radio communications system according to the first embodiment is configured to provide the MBMS in which the radio network controller RNC transmits broadcast data and multicast data to mobile stations UEs belonging to a predetermined group, by using broadcast channels.

Both the mobile stations UEs working in the Idle mode and the mobile stations UEs working in the Connected mode can receive the broadcast data and the multicast data in the MBMS.

Figure 1:
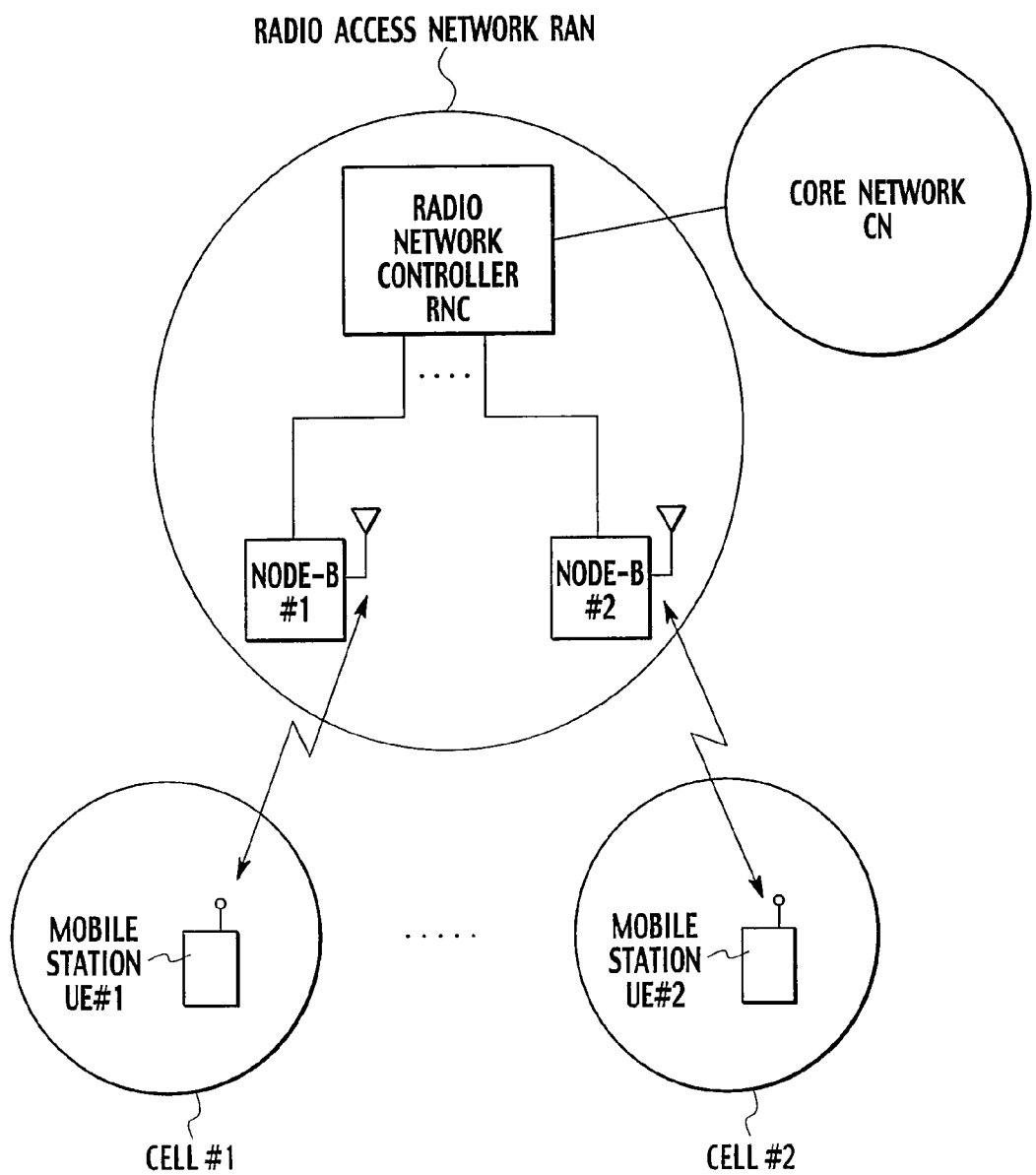
FIG. 1 is a diagram showing the entire configuration of a radio communications system using the W-CDMA scheme.
Figure 2:
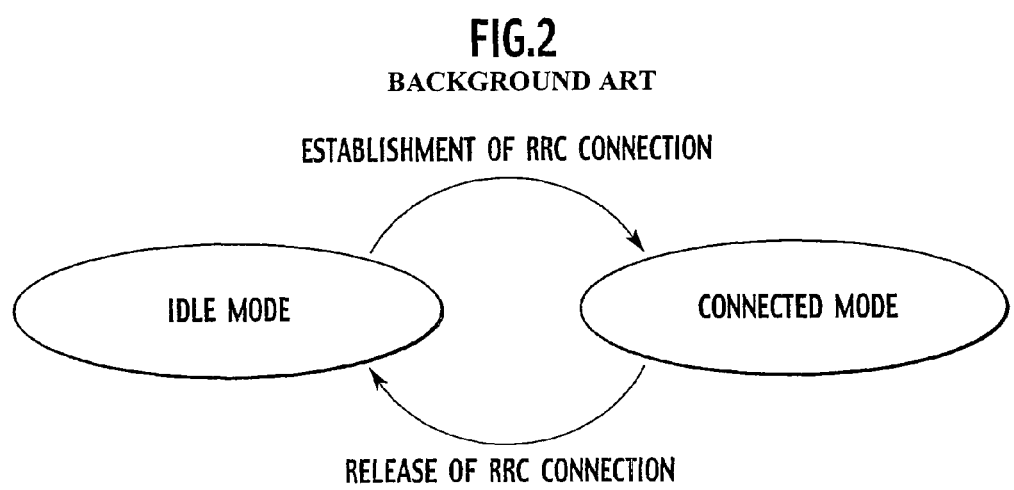
FIG. 2 is a diagram showing a transition of a mobile station in the radio communications system using the W-CDMA scheme.
Figure 3:
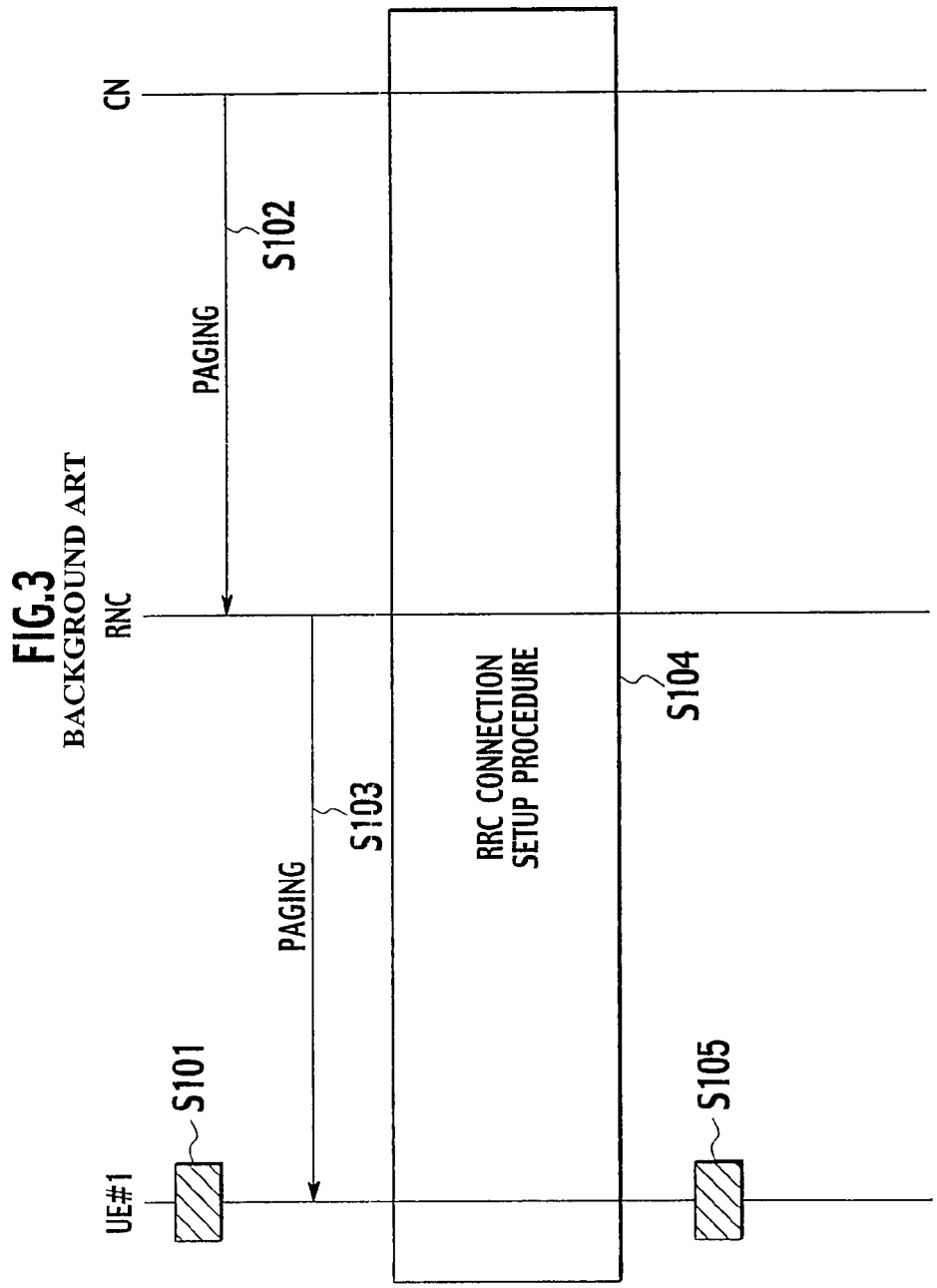
FIG. 3 is a sequence diagram showing an operation of the conventional radio communications system using the W-CDMA scheme.
Figure 4:
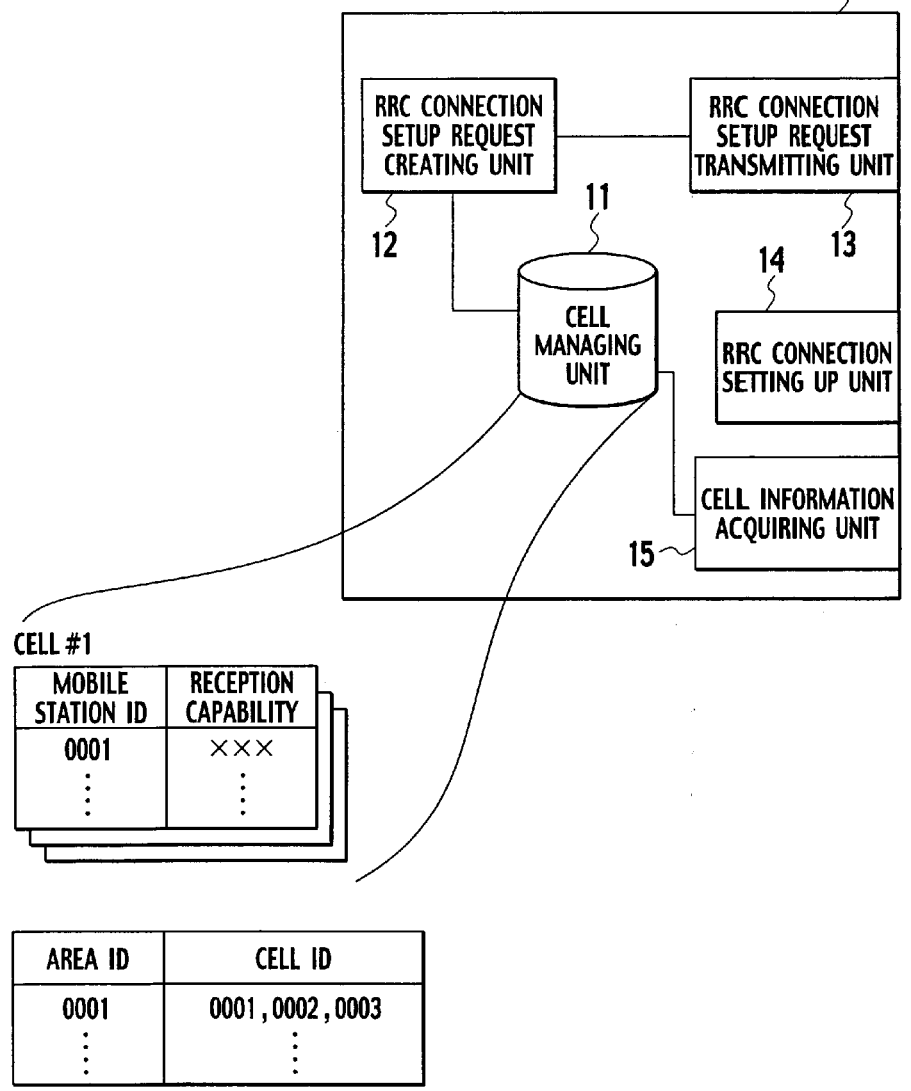
FIG. 4 is a functional block diagram of a radio network controller according to a first embodiment of the present invention.

FIG. 4 shows functional blocks of the radio network controller RNC which is one element of the radio communications system according to the first embodiment.

The radio network controller RNC takes a same part as the radio network controller RNC which is one element of the conventional radio communications system using the W-CDMA scheme.

The radio network controller RNC is configured to set up RRC connections with mobile stations UEs located in cells under control of the radio network controller RNC. Here, the radio network controller RNC can control a plurality of cells.

As shown in FIG. 4, the radio network controller RNC includes a cell managing unit 11, an RRC connection setup request creating unit 12, an RRC connection setup request transmitting unit 13, an RRC connection setting up unit 14, and a cell information acquiring unit 15.

The cell managing unit 11 is configured to manage geographical attributes of cells under control of the radio network controller RNC.

To be more specific, the cell managing unit 11 manages information of cells which form a specific area (for example, vicinity of the Shibuya station, a boundary between a cell under control of the radio network controller RNC and another cell under control of another radio network controller adjacent to the radio network controller RNC).

The cell managing unit 11 can manage the information (the number, the reception capability and the like) of the mobile stations located in each cell under control of the radio network controller RNC.

The RRC connection setup request creating unit 12 is configured to create an RRC connection setup request for request the mobile station UE to set up an RRC connection between the radio network controller RNC and the mobile station UE, at a predetermined timing, for example, in a predetermined cycle.

Here, the RRC connection setup request can be received or identified by the mobile stations UEs located in a specific cell under control of the radio network controller RNC.

The RRC connection setup request can include information showing a timing at which the mobile station UE transmits an RRC connection request in response to the RRC connection setup request.

The RRC connection setup request transmitting unit 13 is configured to transmit the RRC connection setup request to the mobile stations UEs located in a specific cell under control of the radio network controller RNC by using a predetermined transmission method (for example, transmission power, transmission direction and the like). The RRC connection setup request can reach to the mobile stations UEs located in the specific cell.

The RRC connection setup request transmitting unit 13 can be configured to transmit the RRC connection setup request to the mobile stations UEs located in a specific area which is formed by a plurality of cells under control of the radio network controller RNC, by using the predetermined transmission method.

The RRC connection setup request transmitting unit 13 can be configured to transmit the RRC connection setup request to the mobile stations UEs located in a specific area (for example, vicinity of a boundary between cells) which is formed by a part of the cell under control of the radio network controller RNC, by using the predetermined transmission method.

The RRC connection setting up unit 14 is configured to set up an RRC connection between the radio network controller RNC and the mobile station UE, in accordance with the RRC connection request transmitted from the mobile station UE.

The RRC connection setting up unit 14 can be configured to release the established RRC connection between the radio network controller RNC and the mobile station UE, after the cell information acquiring unit 15 acquires information of the mobiles stations UEs located in a specific cell under control of the radio network controller RNC.

The cell information acquiring unit 15 is configured to acquire the information of the mobile stations UEs of the Connected mode located in the specific cell under control of the radio network controller RNC.

Here, the information of the mobile stations UEs include the number of the mobile stations located in a specific cell under control of the radio network controller RNC, the reception capability of the mobile stations located in the specific cell, audience ratings of the MBMS, the number of the mobile stations UEs which takes part in the MBMS and the like.

The cell information acquiring unit 15 can acquire the information of the mobile stations UEs of the Connected mode, can not acquire the information of the mobile stations UEs of the Idle mode.

Figure 5:
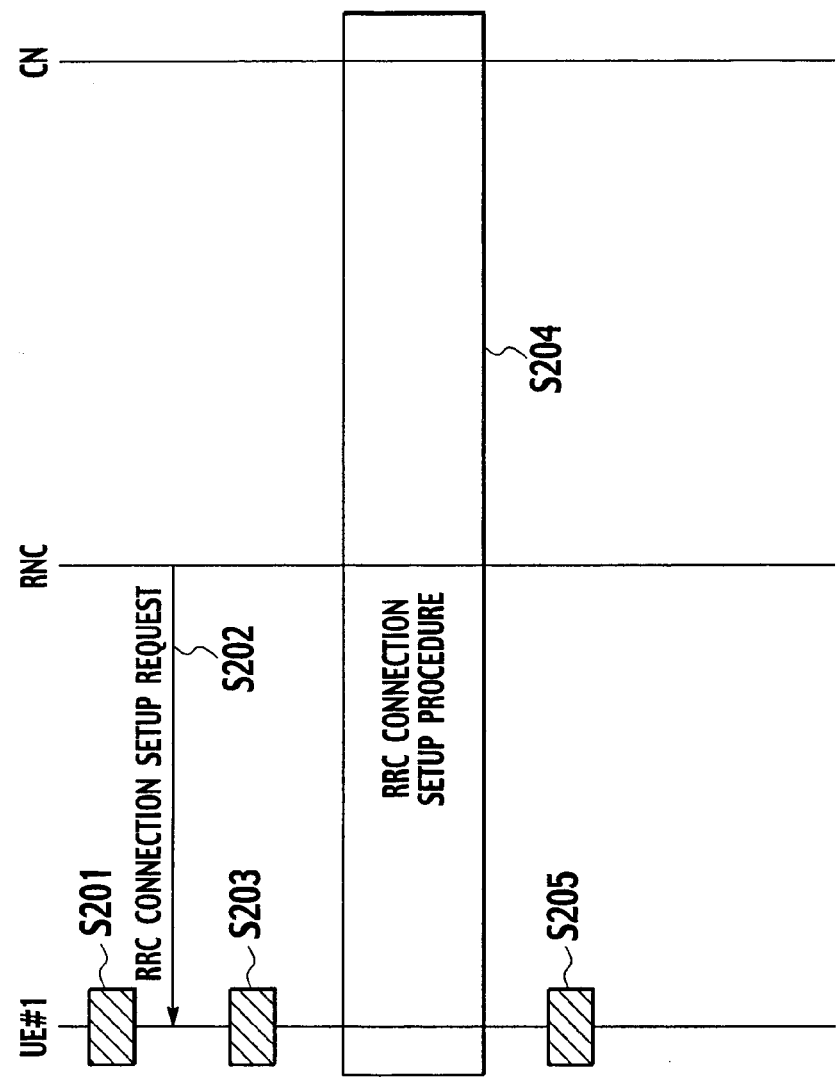
FIG. 5 is a sequence diagram showing an operation of the radio communications system according to the first embodiment.

An Operation of the Radio Communications System According to the First Embodiment Referring to FIG. 5, an operation of the radio communications system according to the first embodiment will be described. FIG. 5 shows a sequence of when the state of the mobile station UE #1 changes from the Idle mode to the Connected mode.

As shown in FIG. 5, in step S201, the state of the mobile station UE #1 is the Idle mode. That is, no RRC connection is established between the mobile station UE #1 and the radio network controller RNC.

In step 202, the radio network controller RNC transmits the RRC connection setup request to the mobile station UE located in a cell #1 under control of the radio network controller RNC at the predetermined timing, by using the above mentioned predetermined transmission method.

In Step 203, the mobile station UE #1 located in the cell #1 receives the RRC connection setup request transmitted from the radio network controller RNC.

The mobile station UE #1 performs the RRC connection setup procedure for set up the RRC connection between the radio network controller RNC and the mobile station UE #1.

In step 205, the state of the mobile station UE #1 changes from the Idle mode to the Connected mode.

Functions and Effects of the Radio Communications System According to the First Embodiment The radio network controller RNC in the radio communications system according to the first embodiment transmits the RRC connection setup request to the mobile station UE #1 of the Idle mode located in the specific cell #1 under control of the radio network controller RNC, and establishes the RRC connection between the radio network controller RNC and the mobile station UE #1. Therefore, the state of all mobile stations UE located in the specific cell #1 can be changed from the Idle mode to the Connected mode, the radio network controller RNC can accurately grasp the information of the mobile stations UEs located in the specific cell #1.

The radio network controller RNC in the radio communications system according to the first embodiment changes the state of the mobile stations UEs located in the specific area (for example, a boundary between cells) in which there is a high possibility that the mobile stations UEs of the Idle mode are moving within the plurality of cells, from the Idle mode to the Connected mode, by setting up the RRC connections between the radio network controller RNC and the mobile stations UEs located in the specific area. Therefore, the radio network controller RNC can efficiently and accurately grasp the information of the mobile stations UEs located in cells under control of the radio network controller RNC.

<Modification 1>

Figure 6:
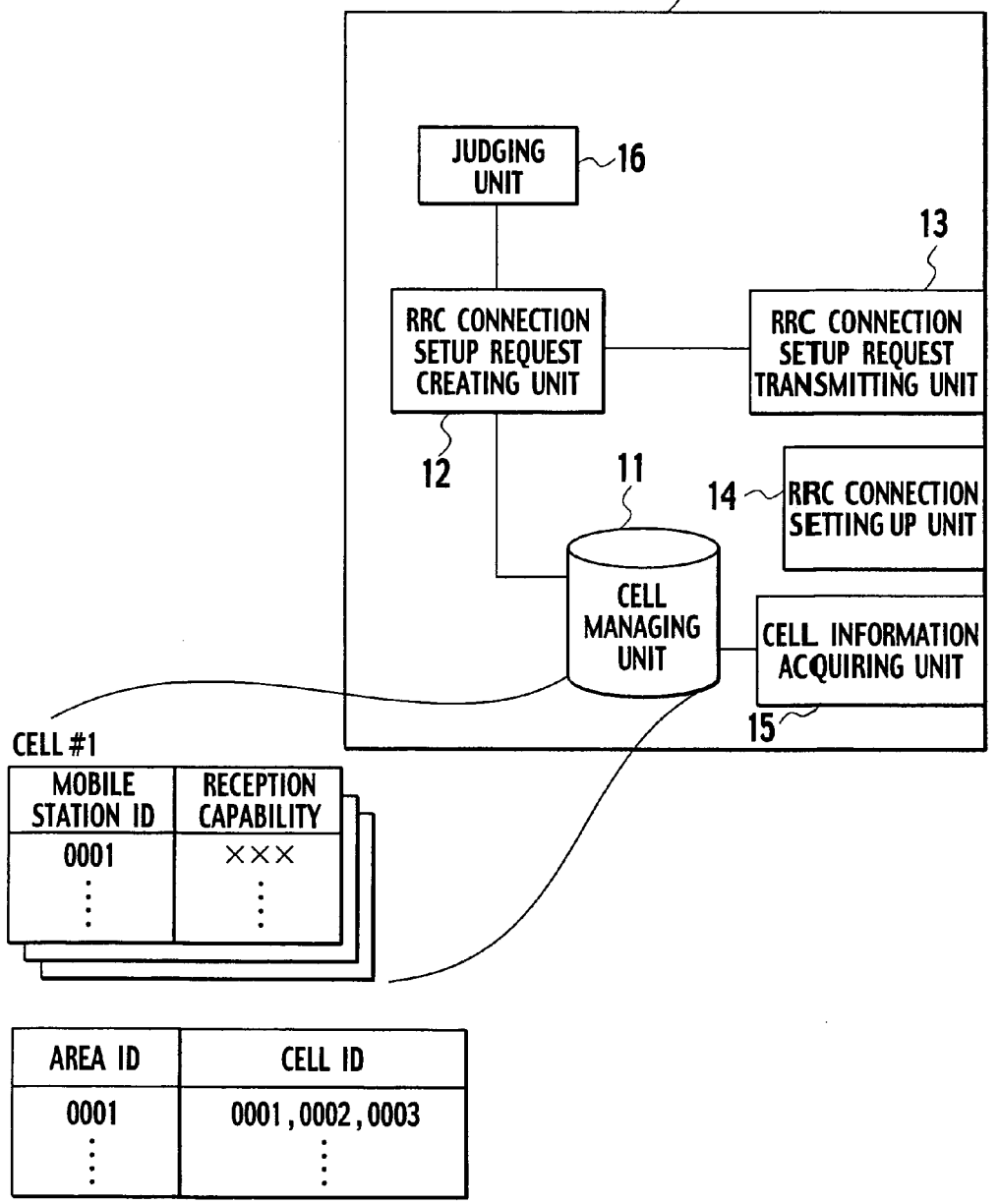
FIG. 6 is a functional block diagram of a radio network controller according to one modification of the present invention.

Referring to FIG. 6, a radio communications system according to a modification 1 of the present invention will be described. Hereinafter, the difference between the radio communications system according to the modification and the radio communications system according to the first embodiment will be described mainly.

As shown in FIG. 6, a radio network controller RNC which is one element of the radio communications system according to the modification 1 includes a judging unit 16, in addition to the functions of the radio communications system according to the first embodiment.

The judging unit 16 is configured to judge whether or not to need to acquire information of the mobile stations UEs located in a specific cell under control of the radio network controller RNC.

To be more specific, the judging unit 16 can be configured to judge to need to acquire the information of the mobile stations UEs located in the specific cell, in accordance with an instruction from the core network CN (for example, a request of audience research of the MBMS).

The judging unit 16 can be configured to judge to need to acquire the information of the mobile stations UEs located in the specific cell by itself.

For example, the judging unit 16 can be configured to judge to need to acquire the information of the mobile stations UEs located in the specific cell, when the number of the mobile stations UEs of the Connected mode located in the specific cell falls below a predetermined number.

The RRC connection setup request creating unit 12 is configured to create the RRC connection setup request directed for the mobile stations UEs located in the specific cell, when the judging unit 16 judges to need to acquire the information of the mobile stations UEs located in the specific cell.

The radio network controller RNC in the radio communications system according to the modification 1 can change the state of all mobile stations UEs located in the specific area #1, from the Idle mode to the Connected mode, when the radio network controller RNC judges to need to acquire the information of the mobile stations UEs located in the specific cell #1, in accordance with the instruction from the core network CN or the judgment of the radio network controller RNC. Therefore, the radio network controller RNC can accurately grasp the information of the mobile stations UEs located in the specific cell #1.

The present invention can provide a radio communications method in which the radio network controller can accurately manage the information of the mobile stations located in cells under control of the radio network controller, and a radio network controller used in the radio communications method.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A radio network controller which can set up a connection with a mobile station located in a specific cell under control of the radio network controller, the radio network controller comprising:

a connection setup request transmitter configured to transmit a connection setup request requesting set up of the connection to the mobile station located in the specific cell;

a judger configured to judge whether or not a need exists to acquire information of the mobile station located in the specific cell, wherein the judger is configured to judge that the need exists to acquire the information of the mobile station when a number of mobile stations of a connected mode located in the specific cell is less than a predetermined number, an RRC connection setter configured to make the mobile station, which is in an idle mode, change into the mobile station of the connected mode by setting up an RRC connection between the radio network controller and the mobile station of the idle mode located in the specific cell, when the judger judges the need exists to acquire the information of the mobile station; and a cell information acquirer configured to acquire the information of the mobile station from the mobile station of the connected mode located in the specific cell, wherein the connection setup request transmitter is configured to transmit the connection setup request to the mobile station located in the specific cell, when the judger judges that the need exists to acquire the information of the mobile station; and the cell information acquirer is configured to acquire at least one of the number of mobile stations located in the specific cell, a reception capability of the mobile station, an audience rating of an MBMS, and the number of the mobile stations taking part in the MBMS.

2. The radio network controller according to claim 1, wherein the connection setup request transmitter is configured to transmit the connection setup request to a mobile station located in a specific area which is formed by at least one cell under control of the radio network controller.

3. A radio communications method for setting up a connection between a radio network controller and a mobile station located in a specific cell under control of the radio network controller, the method comprising:

transmitting, from the radio network controller, a connection setup request requesting set up of the connection to the mobile station located in the specific cell;

judging whether or not a need exists to acquire information of the mobile station located in the specific cell, wherein the judging step judges that the need exists to acquire the information of the mobile station when a number of mobile stations of a connected mode located in the specific cell is less than a predetermined number;

causing the mobile station, which is in an idle mode, to change into the mobile station of the connected mode by setting up an RRC connection between the radio network controller and the mobile station of the idle mode located in the specific cell, when it is judged that the need exists to acquire the information of the mobile station; and acquiring the information of the mobile station from the mobile station of the connected mode located in the specific cell, the acquired information including at least one of the number of mobile stations located in the specific cell, a reception capability of the mobile station, an audience rating of an MBMS, and the number of the mobile stations taking part in the MBMS; and setting up, at the mobile station, the connection with the radio network controller in accordance with the received connection setup request.

* * * * *